(12) United States Patent
Chappell et al.

(10) Patent No.: US 10,788,893 B1
(45) Date of Patent: Sep. 29, 2020

(54) COMPUTER TABLET AUGMENTED WITH INTERNALLY INTEGRATED EYE-TRACKING CAMERA ASSEMBLY

(71) Applicant: EyeTech Digital Systems, Inc., Mesa, AZ (US)

(72) Inventors: Robert C. Chappell, Mesa, AZ (US); Bryson C. Hinton, Mesa, AZ (US); Michael S. Holford, Gilbert, AZ (US)

(73) Assignee: EyeTech Digital Systems, Inc., Mesa, AZ (US)

( * ) Notice: Subject to any disclaimer, the term of this patent is extended or adjusted under 35 U.S.C. 154(b) by 0 days.

(21) Appl. No.: 16/533,175

(22) Filed: Aug. 6, 2019

(51) Int. Cl.
  *G06F 3/01* (2006.01)
  *G06F 1/16* (2006.01)
(52) U.S. Cl.
  CPC ............ *G06F 3/013* (2013.01); *G06F 1/1626* (2013.01); *G06F 1/1686* (2013.01)
(58) Field of Classification Search
  None
  See application file for complete search history.

(56) References Cited

U.S. PATENT DOCUMENTS

| | | | |
|---|---|---|---|
| 5,367,315 A | 11/1994 | Pan | |
| 7,572,008 B2 | 8/2009 | Elvesjo | |
| 8,350,889 B1 * | 1/2013 | Shammoh | H04N 7/142 348/14.01 |
| 2014/0225131 A1 * | 8/2014 | Benson | G06F 1/1643 257/82 |
| 2015/0223684 A1 | 8/2015 | Hinton | |
| 2015/0227735 A1 | 8/2015 | Chappell | |
| 2015/0235355 A1 | 8/2015 | Mullins | |
| 2016/0106315 A1 | 4/2016 | Kempinski | |
| 2016/0262685 A1 | 9/2016 | Wagner et al. | |
| 2017/0068287 A1 * | 3/2017 | Jung | G06F 1/1686 |
| 2017/0345198 A1 | 11/2017 | Magpuri et al. | |
| 2018/0101013 A1 | 4/2018 | Moore et al. | |
| 2018/0114298 A1 | 4/2018 | Malaika et al. | |
| 2018/0232048 A1 | 8/2018 | Popovich et al. | |
| 2018/0307270 A1 * | 10/2018 | Pantel | G06F 1/1637 |
| 2019/0287495 A1 | 9/2019 | Mathur et al. | |
| 2019/0302881 A1 | 10/2019 | Chan et al. | |
| 2019/0312973 A1 | 10/2019 | Engelke et al. | |

\* cited by examiner

*Primary Examiner* — Joseph R Haley
(74) *Attorney, Agent, or Firm* — Jennings Strouss & Salmon PLC; Daniel R. Pote (57) ABSTRACT

A method of integrating an eye tracking assembly into a computer display comprises: providing a computer display having a bottom edge, a horizontal dimension H and a vertical dimension V; attaching a backplane to the display such that a first portion extends below the display, the first portion having a horizontal dimension H and a vertical dimension D; and adhering a transparent layer to the display such that a second portion extends below the display, the second portion having a horizontal dimension H and a vertical dimension D; and installing the tracking assembly at least partially inside an accessory region between the first and second portions.

11 Claims, 11 Drawing Sheets

COMPUTER TABLET AUGMENTED WITH INTERNALLY INTEGRATED EYE-TRACKING CAMERA ASSEMBLY

TECHNICAL FIELD

The present invention relates, generally, to eye-tracking systems and methods and, more particularly, to improved computer displays having eye-tracking camera assemblies integrated into the display interior.

BACKGROUND

Eye tracking systems (referred to herein as eye trackers or simply trackers) generally include a plurality of illuminators configured to direct infrared light to the user's eyes, a lens for directing infrared light reflected from the user's eyes to an image sensor which converts the analog light signals received from the lens into digital image data, and related electronics, image processing, and control software. These components are arranged within a housing affixed to laptop and desk top computer displays.

To reduce the extent to which the user's eyelids interfere with light transmitted from the illuminators and reflected back from the eyes to the lens, presently known tracker housings are typically affixed to the bottom edge of desktop displays, or secured to laptops near the hinged junction between the keyboard and the display. As a result, the assistive value of the tracking technology—while substantial—may be subtly undermined by a mechanically cumbersome and visually conspicuous delivery modality. These drawbacks are at variance with contemporary inclusion-based policies which seek to accommodate differently abled persons within the framework of main stream social structures, where possible.

Devices and systems are thus needed which overcome these and other shortcomings of the prior art.

SUMMARY

In accordance with one aspect of the present invention, the tracker assembly may be partially or wholly integrated into the display; with all of the tracking system components preferably disposed entirely within the envelope defined by the display housing. This eliminates the need for a separate tracker housing.

A preferred embodiment involves augmenting or retrofitting a current tablet computer, such as the various Latitude™ tablets offered by Dell, Inc of Round Rock, Tex., to include an internal tracker system. This approach advantageously provides: i) streamlined design, manufacturing, and assembly costs by bootstrapping existing structural, optical, and electronic components; ii) a tracker enabled tablet which, upon casual inspection, is indistinguishable from "normal" tablets and thus avoids drawing unnecessary attention to a differently abled user; and iii) stealth cachet for the discriminating gamer.

A further aspect of the invention combines a distance (or presence) sensor scale with an image sensor used in conjunction with a processing algorithm to track the user's eyes for the purpose of reducing power consumption. By way of illustrative example, the system can be trained to reliably determine whether a user is within a predetermined range from the computing device. If so, the device may remain powered until the user resumes interacting with the device. If, however, the system determines that no user is present, it can terminate or suppress (e.g., enter sleep mode) power to one or more of the following components: the image sensor, lights, and/or the Xilinx or other chip sets and processing and data transmission features.

In this regard, the system may determine that a putative user is in range and respond by either powering up dormant components or maintaining power to currently powered components. If the system subsequently fails to detect the user's eyes it can initiate a power down sequence or protocol. By periodically cycling through various detection routines the system can monitor the sleep state of a nearby user and immediately power up the system when the user wakes up. These power saving features are not only environmentally, socially, and economically responsible, they promote enhanced consumer value for tablet applications where power and battery life issues are particularly compelling.

BRIEF DESCRIPTION OF THE DRAWINGS

The ensuing description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

In a preferred embodiment, an "all-in-one" tablet computer which includes an integral tracking assembly derives from an existing or "precursor" tablet which does not include a tracker. As a general proposition, conventional tablet computers include a backplane mounted to the rear surface of a mother board, and a forward facing display mounted to the front surface of the motherboard. The backplane may also include a perimeter lip which extends forward to mate with and circumscribe a corresponding perimeter of the display, encapsulating the motherboard therebetween. A support stand may be hingedly connected to the back side of the backplane and configured to selectively extend therefrom. In presently known tablets, the display, motherboard, and backplane are essentially coextensive stacked rectangles of the same size and shape (horizontal width and vertical height dimensions).

In this regard, the term "motherboard" may refer to a single, monolithic support structure on which various integrated circuits, chip sets, and discrete electronic devices are mounted, whereupon the motherboard is attached to the front facing surface of the backplane. State of the art motherboards typically include connection sites and ports specifically adapted to the components to be mounted thereon. Alternatively, the term "motherboard" may contemplate a plurality of sub-assemblies and discrete components, each of which are independently mounted to the backplane, but which together comprise the functional equivalent of a conventional motherboard.

The design and manufacture of a tracker equipped tablet of the present invention suitably begins with the same display connected to the same motherboard (albeit perhaps modified as described below) used in an existing tablet. The existing tablet design is then adapted in three principle respects:
  i) a thin transparent cover having the same width dimension as the display is adhered to the front surface of the display, with the vertical dimension of the cover being greater than the vertical dimension of the display such that a portion of the cover extends beyond an edge of the display (e.g., downwardly below the bottom edge);
  ii) the backplane is similarly extended vertically so that it also extends below the bottom edge of the display in the same manner and to the same extent as the front cover; and
  iii) a tracking assembly is mounted to a thin planar strip (referred to herein as an optical bench) and interposed between the overhanging segments of the front cover and backplane, for example by mounting the optical bench to the inside surface of the backplane.

Figure 1:
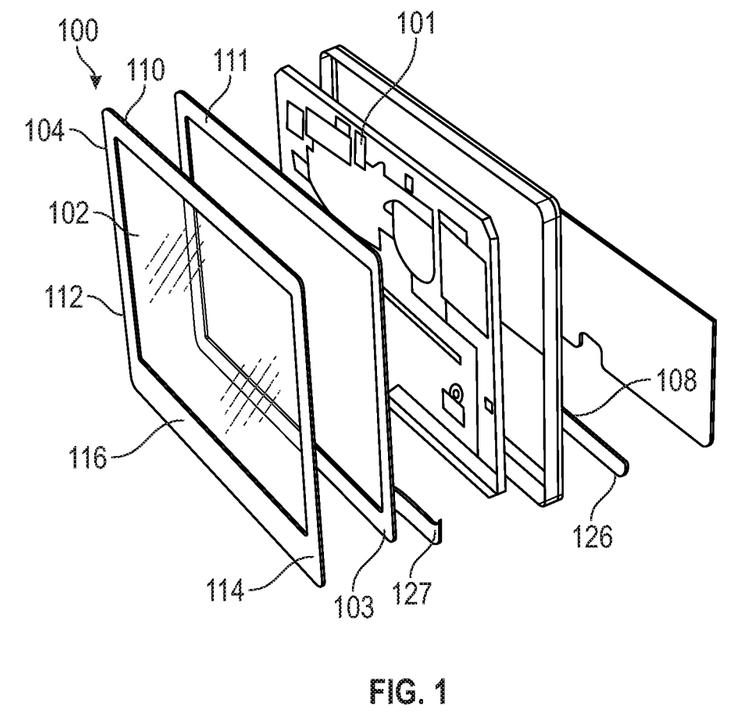
FIG. 1 is an exploded perspective view of an exemplary computer display for use with a tablet, laptop, desk top, or other computing device.
Figure 2:
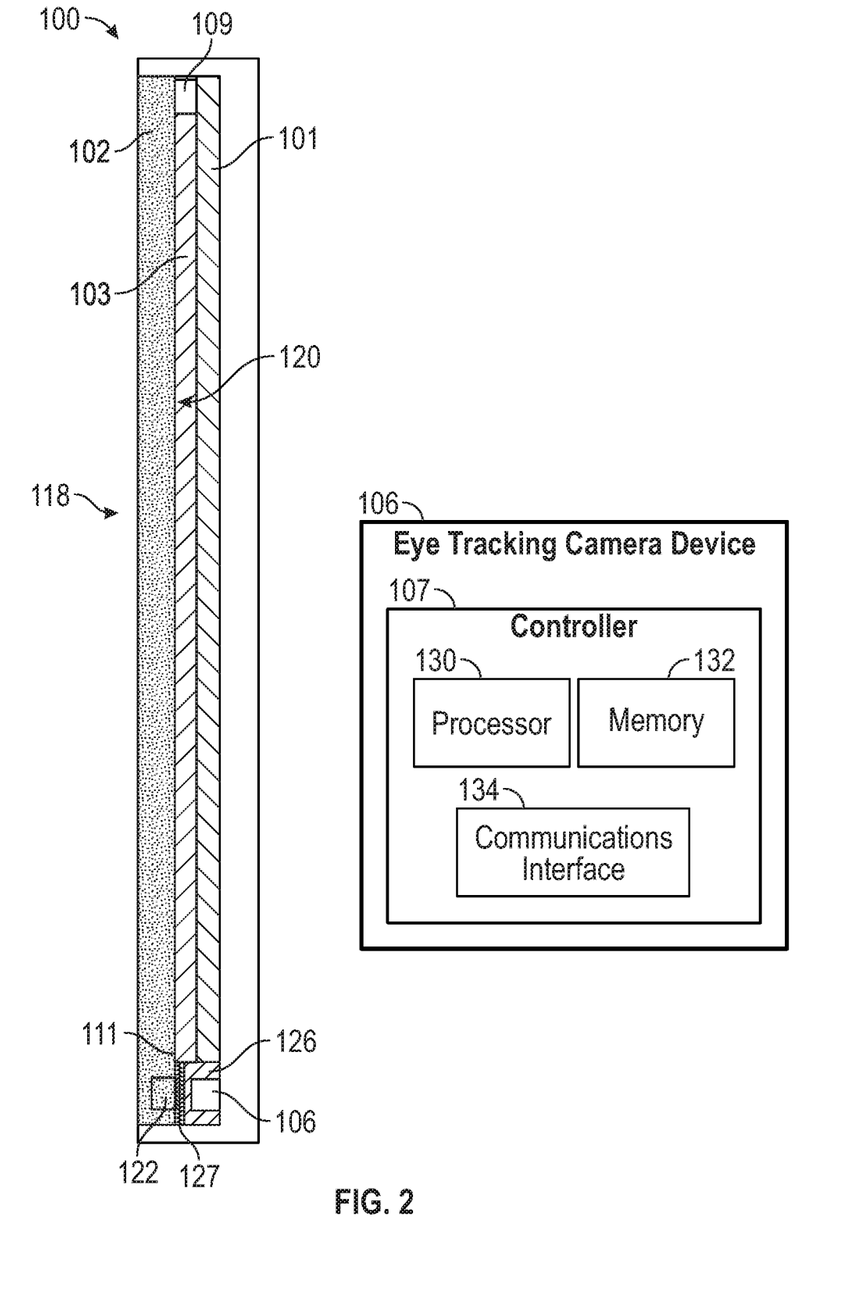
FIG. 2 is a cross-sectional view of the assembled display shown in FIG. 1.

Turning now to FIGS. 1 and 2, a tracker equipped tablet computer 100 comprises a transparent front cover screen 102 having a selectively opaque boundary region 104, and an eye-tracking camera device 106 mounted to an optical bench 126. In some embodiments, the tablet computing device 100 initially comprises an existing standalone or legacy device that is subsequently modified and converted into the display apparatus of the present disclosure. Alternatively, some of the same parts used to make the legacy device may be combined with other specially designed parts to produce the tablet computing device 100.

In some embodiments the transparent front cover screen 102 may comprise a chemically strengthened glass material such as, for example, alkali-aluminosilicate, formed by bonding aluminum, silicone and oxygen together. Suitable materials include Gorilla Glass by Corning Inc.; other formulations are available from AGC Inc., Dragontrail, and Schott AG Xensation.

In various embodiments, the tablet computing device 100 includes a display screen 12, a backplane 502, and a motherboard 16 sandwiched between the display and the backplane. The tablet computing device 100 may optionally include a conventional webcam 18 (see FIG. 2) located near the top edge of the display.

In some embodiments, the cover 102 may comprise a layer of transparent or semi-transparent (selectively opaque) material such as a glass or a plastic. The dimensions of the transparent screen 102 are configured to substantially correspond to the dimensions of the display screen 12 over which the transparent screen 102 is positioned when the illustrated components are joined together. In some embodiments, the transparent screen 102 may transmit touch input to the display screen 12, while in other embodiments the transparent screen is not configured to transmit touch input. In some embodiments, the transparent screen 102 can be joined to the display screen 12 using any suitable optical adhesive.

In another embodiment the opaque layer 104 comprises a contrasting border having one or more of a top portion 110, a first side portion 112, a second side portion 114, and a bottom portion 116. The dimensions and wavelength selectivity of the border can vary as appropriate to aesthetically frame the display, conceal the tracking assembly from view, and at the same time allow the infrared light to pass therethrough. According to some embodiments, the opaque layer 104 may be formed using a silk-type screening process or other suitable method where an ink or other similar material is selectively deposited using a predetermined pattern.

The transparent screen 102 includes a front surface 118 and a back surface 120. In one embodiment, the back surface 120 of the transparent screen 102 extends beyond an outer peripheral edge 20 of the display screen. In some embodiments, the back surface 120 of transparent screen 102 is adapted to clip over or surround the outer peripheral edge 20 of the tablet computing device 100 such that the transparent screen 102 visually and tactilely appears to be a component of the tablet.

In various embodiments, the eye-tracking camera device 106 is mounted to an optical bench 126. The bottom portion 116 of the transparent screen 102 includes a physical and/or optical aperture 122. In some embodiments, the aperture 122 is not a complete opening, but a cylindrical hole covered by a thin layer of material of the transparent screen 102.

A camera lens of the eye-tracking camera device 106 is advantageously aligned with the aperture 122. According to some embodiments, the aperture 122 is covered by the opaque layer 104 to hide the eye-tracking hardware, but which allows the eye-tracking camera device 106 to obtain image data pertaining to the user's face.

In FIG. 2, a cross section of the tablet compute 100 is illustrated. As noted above, the eye-tracking camera device 106 may be mounted to the optical bench 126 disposed behind the transparent screen 102. The optical bench 126 comprises a mounting plate 129 (See FIG. 4) that supports components of eye-tracking camera device 106. In some embodiments a filter member 127 is placed in front of the optical bench 126. The filter member 127 allows only selected wavelengths to pass through to the eye-tracking camera device 106 housed within the optical bench 126.

FIG. 2 also includes a schematic view of an example eye-tracking camera device, such as the eye-tracking camera device 106 of FIGS. 1 and 2. In some embodiments, the eye-tracking camera device 106 comprises controller 107 having a processor 130 and a memory 132. The memory stores instructions that are executed by the processor 130 to perform aspects of the eye and gaze tracking, as well as eye-tracking camera device control as disclosed herein. In some embodiments, image analysis and eye and gaze tracking can be performed using a cloud service, whereas control of the eye-tracking camera device 106 can be performed by the tablet computing device 10 operating as a network device (see FIG. 3 for an example cloud-embodiment). In other embodiments, image processing and eye and gaze tracking can be performed by the processor 130 of the eye-tracking camera device 106. In various embodiments, the optical bench 126 also houses an optical sub-assembly, which is schematically illustrated and described with respect to FIG. 4.

When referring to operations executed by the eye-tracking camera device 106 it will be understood that this may include the execution of instructions by the processor 130. The eye-tracking camera device 106 may also comprise a communications interface 134 that allows the processor 130 to communicate transmit and receive data over a network, as will be discussed in greater detail herein with reference to FIG. 3.

Figure 14A:
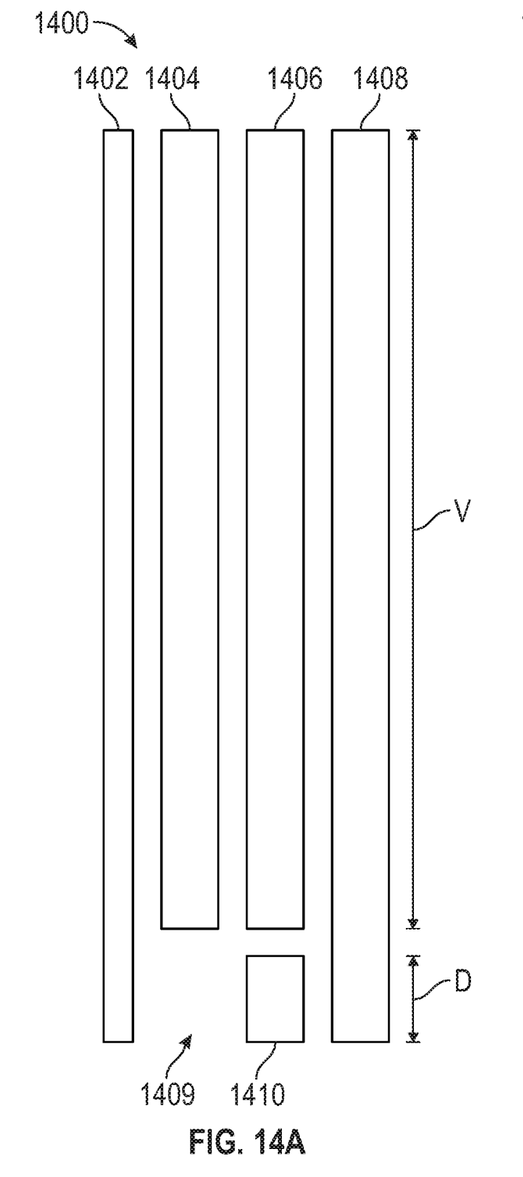
FIGS. 14A and 14B are schematic block diagrams illustrating various embodiments, one including a front cover layer, a display, a motherboard, and a backplane forming a device region within which a tracker assembly is positioned, and an alternate embodiment in which the motherboard is not included within the assembly.
Figure 14B:
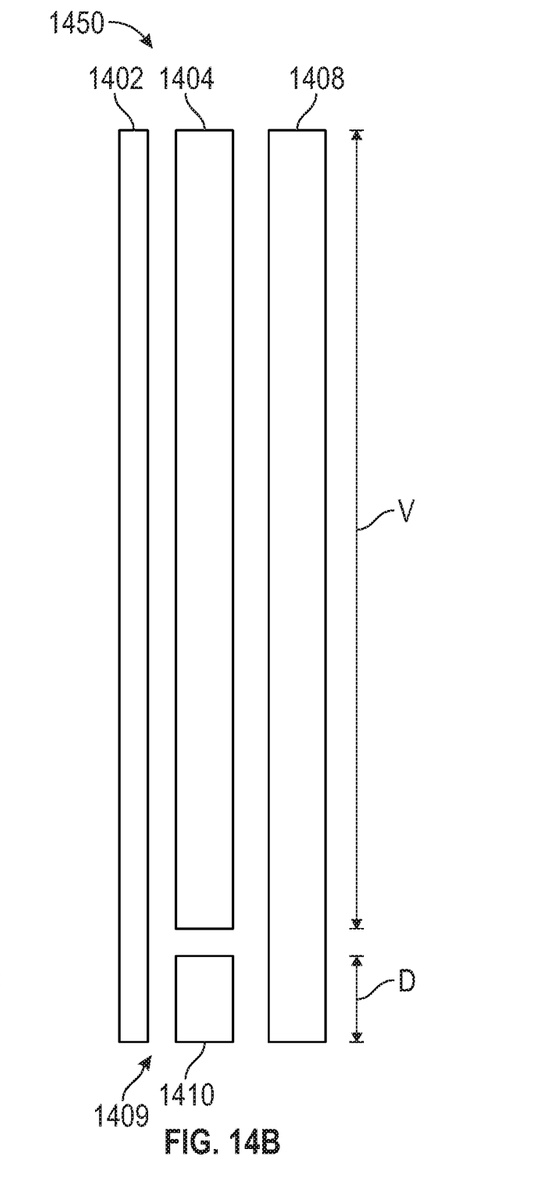

With momentary reference to FIG. 14A, an exemplary tracker equipped tablet computer 1400 includes a front cover layer 1402, a display 1404, a motherboard 1406, and a backplane 1408 which, when assembled, form a device region 1409 within which a tracker assembly 1410 may be secured. In particular, the display has a vertical dimension V, whereas the vertical dimension of the front panel and backplane is V+D, thereby yielding the device region. In an alternate embodiment, as illustrated in FIG. 14B, an assembly 1450 includes only the front cover layer 1402, display 1404, and backplane 1408, forming a device region 1409 within which tracker assembly 1410 may be secured. It will be appreciated that assembly 1450 (which, in contrast to tablet computer 1400, does not include a motherboard) may be suitably used in connection with a variety of computing devices, and is not limited to any particular tablet computer hardware.

Figure 3:
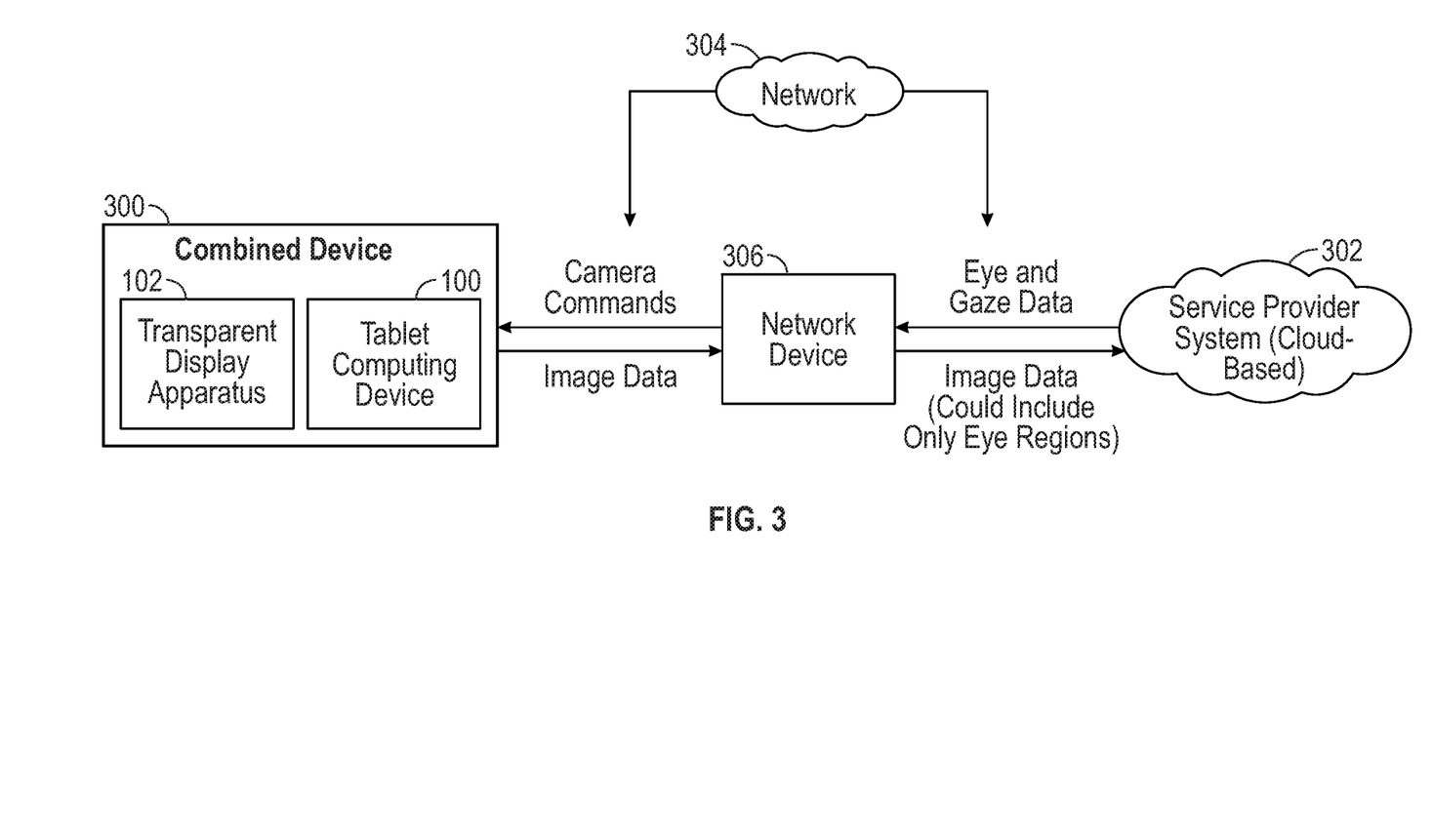
FIG. 3 is a schematic diagram of an exemplary operating environment in which various aspects of the present disclosure may be implemented.

FIG. 3 illustrates an environment where an example device 300 can include the transparent display apparatus 100 in combination with the tablet computing device 10, referred to in this example as a combined device 300. In various embodiments, the combined device 300 can communicate with a service provider system 302 over a network 304. The network 304 may include any one or a combination of multiple different types of networks, such as cable networks, the Internet, wireless networks, and other private and/or public networks. In some instances, the network 304 may include cellular, Wi-Fi, or Wi-Fi direct. The transparent display apparatus 100 can communicate with the tablet computing device 10 and/or the service provider system 302 over the network 304 using a communications interface (see communications interface 134 of FIG. 2). In general, the eye-tracking camera device of the transparent display apparatus 100 can obtain image data, such as images of a face of a user. The transparent display apparatus 100 can transmit the image data to the service provider system 302 over the network 304 for processing.

The service provider system 302 generates eye and gaze data that can be transmitted back to the transparent display apparatus 100 over the network 304. In some embodiments, the eye and gaze data can be transmitted to the tablet computing device 10. The tablet computing device 10 can be used to control the eye-tracking camera device of the transparent display apparatus 100 based on the eye and gaze data. As noted above, the tablet computing device can operate as a network device 306. The network device 306 is illustrated as being positioned between the device 300 and the service provider system 302, signifying that the network device 306 can be separated from the eye-tracking camera device included in the transparent display apparatus 100. Stated otherwise, in some embodiments, the network device 306 is the tablet computing device 10, and the device 300 would include only the transparent display apparatus 100. As noted above, the image processing and eye and gaze tracking methods can be performed at the device level, the service provider system level, or the network device, or cooperatively therebetween.

Figure 4:
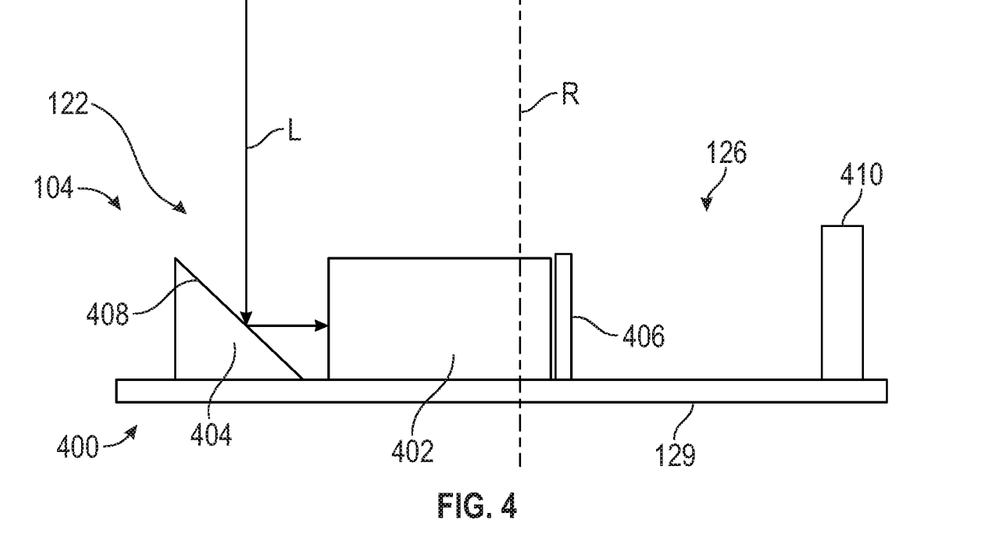
FIG. 4 is a schematic diagram of an exemplary optical sub-assembly for capturing and recording image data in the context of an integrated display.

FIG. 4 is a top down view of an exemplary optical sub-assembly comprising compact optical elements that allow for extended focal length, while remaining small enough to be housed in the small space between the front screen and backplane. In this regard, effective eye-tracking sometimes requires extended focal length lenses, which can lead to bulky or elongated eye-tracking cameras. In view of this, the optical sub-assembly 400 can include a lens tube (or barrel) 402, an angled mirror 404, and an image sensor 406. The lens barrel 402 can be placed substantially perpendicularly to a line of reference R extending normally to the display screen. The angled mirror 404 is placed alongside the lens barrel 402 and is disposed in a line of sight L of the lens barrel 402. Generally, the angled mirror 404 is used to direct image information embedded in reflected light from the user's eyes into the lens barrel 402. That is, the angled mirror 404 receives the image signals along the line of reference L and redirects them in a direction that is substantially perpendicular to the line of reference R. The optical sensor 406 can be communicatively coupled to the processor 130 of the eye-tracking camera device 106 (see FIG. 2). In some embodiments, the angled mirror 404 is aligned with the aperture 122 of the opaque layer 104.

In various embodiments, an angled surface 408 of the mirror 404 is disposed at a 45 degree angle relative to the line of reference R. It will be understood that the angle of the angled surface 408 of the angled mirror 404 can vary according to design requirements, such as desired focal length. It will be understood that in some embodiments, the angled mirror 404 can be omitted allowing for the use of the lens barrel 402 and optical sensor 406. As noted above, in some embodiments, the optical sensor 406 can be used to sense light, such as near-infrared light or infrared light. Thus, according to some embodiments, the optical sub-assembly 400 can also include one or more light emitting members such as light emitting member 410. The light emitting member(s) can be used in eye tracking processes where light emitting from the light emitting member(s) is reflected by the eye(s) of the user and sensed by the optical sensor 406.

Figure 7:
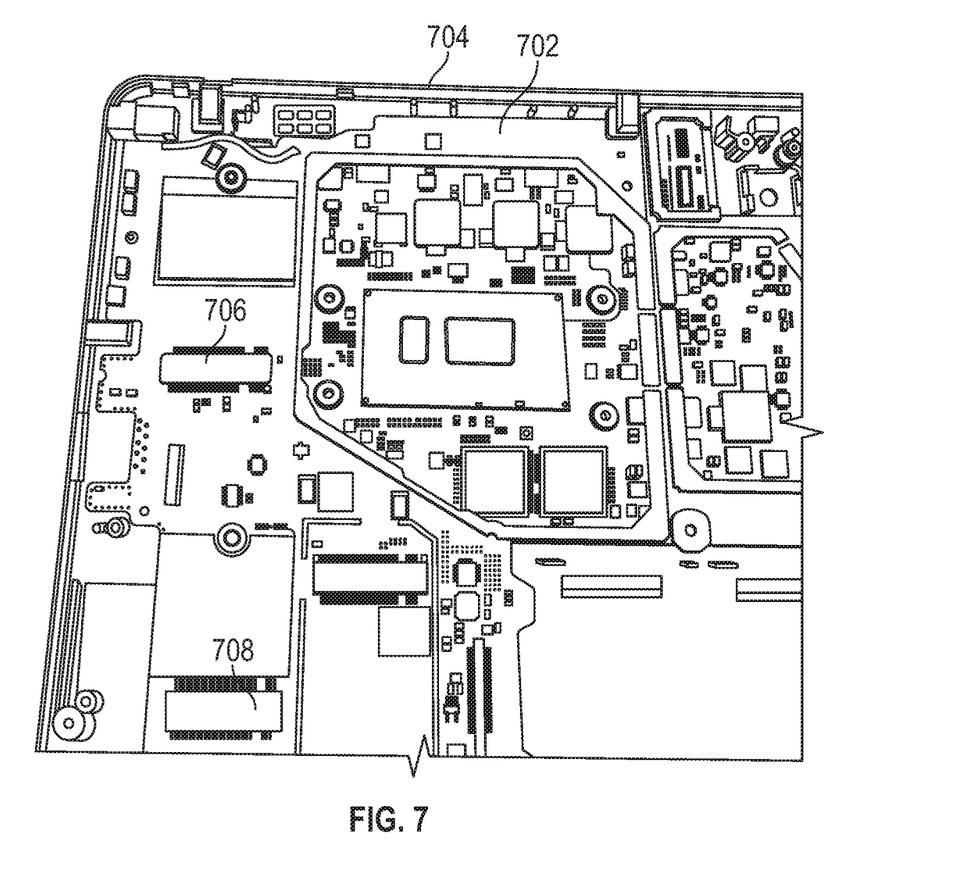
FIG. 7 is a top plan schematic view of a portion of the mother board depicting various topologies and arrangements of circuit board sub-assemblies in accordance with various embodiments.
Figure 8:
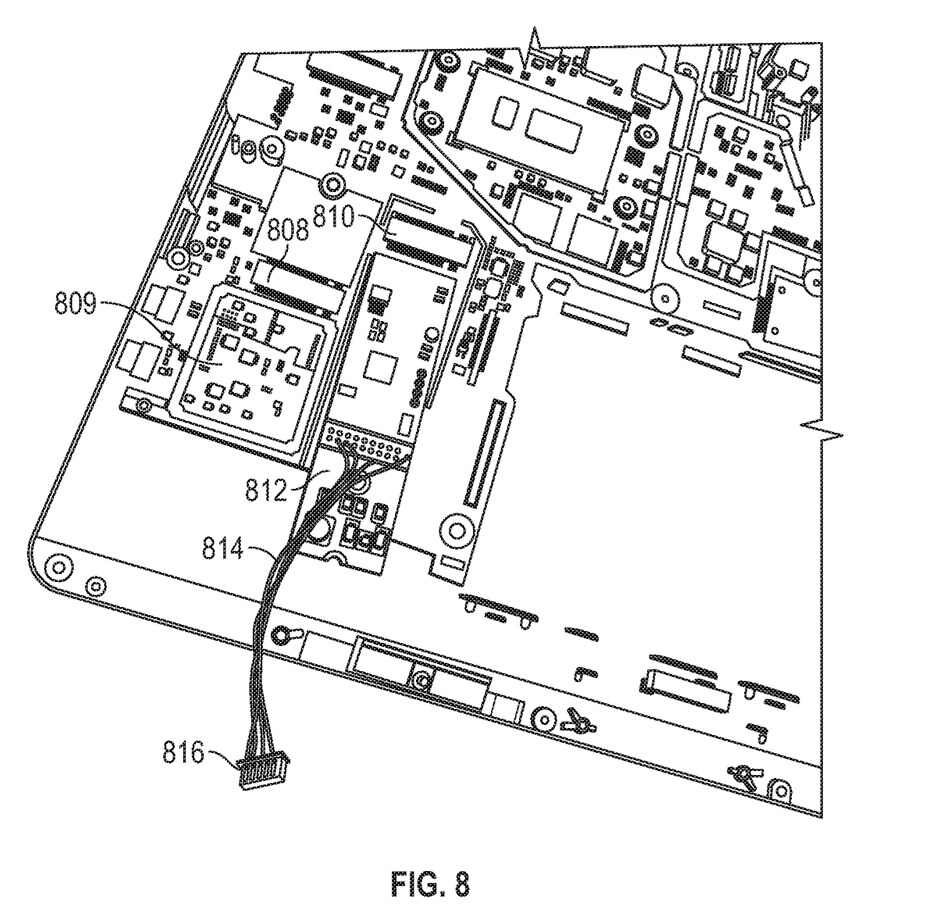
FIG. 8 illustrates another region of the mother board of FIG. 7 depicting the position of the USB circuit.

In accordance with a further aspect of the invention, the present inventors recognize that the M.2 PCB circuit board standard supports connectivity for number of different pin topologies, including WAN, LAN, and USB board connections. With reference to FIGS. 7 and 8, an exemplary mother board 702 (shown attached to a backplane 704) comes prefabricated with a wireless WAN connection port 706 and a wireless LAN connection port 708. The present inventors have determined that eschewing the WAN feature in favor of the LAN feature frees up the WAN port for other uses.

In particular, the operating system code and associated drivers may be implemented on an M.2 compatible sub-circuit board 809 and connected the port 808 originally designated for the WAN card. This, in turn, allows the connection port 810 (previously dedicated to the CPU) to be used for USB connectivity. Moreover, by placing the USB connector cable 814 extending from the USB board 812 at the opposite end of the USB board from the M.2 pin connection 810, the terminal connector 816 located at the end of the USB cable is fortuitously disposed proximate the bottom edge of the display housing, conveniently accessible to the corresponding USB connection associated with the tracker assembly located just below the display.

A further aspect of the invention combines a distance sensor (alternatively referred to as a "presence sensor" or "proximity sensor") for the purpose of reducing power consumption and/or for further refining its eye tracking accuracy. By way of illustrative example, the system can be trained to reliably determine whether a user is within a predetermined range of the computing device. If so, the device may remain powered until the user resumes interacting with the device. If, however, the system determines, via the proximity sensor, that no user is present, it can terminate or suppress (e.g., enter sleep mode) power to one or more of the following components: the image sensor, lights, and/or the Xilinx or other chip sets and processing and data transmission features. While a variety of proximity sensors may be used in conjunction with the present system, in accordance with one embodiment a sensor having an operating frequency that is substantially different from the eye tracking camera device is employed—for example, a distance sensor having a frequency of between approximately 800 and 1000 nm, such as a 950 nm, time-of-flight proximity sensor manufactured by AMS AG. The present invention is not limited to the use of proximity sensors to determine user position, however. Other techniques may be used, such as determining the distance based on the positions of a pair of corneal reflections observed on the user's eyes—a distance that is inversely related to the distance of the user's eyes from the respective illumination sources.

Figure 5:
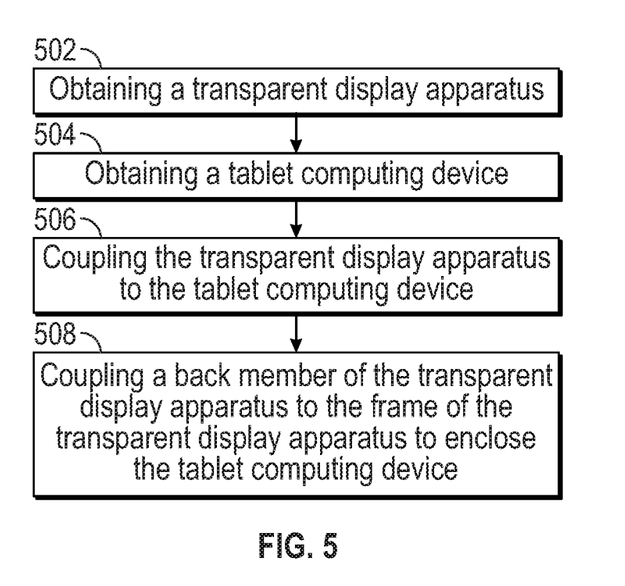
FIG. 5 is a flowchart setting forth an exemplary manufacturing method in accordance with various embodiments.

FIG. 5 describes an exemplary technique for coupling a transparent display apparatus of the present disclosure with a tablet computing device. The method can include a step 502 of obtaining a transparent display apparatus, as well as a step 504 of obtaining a tablet computing device.

The method includes a step 506 of coupling the transparent display apparatus to the tablet computing device. This can include coupling the transparent screen of the transparent display apparatus to a display screen of the tablet computing device. In some embodiments, the method can include a step 508 of coupling a back member to the transparent screen of the transparent display apparatus to enclose the tablet computing device. This can include disposing an optical bench between the transparent screen and the back member. As noted above, the optical bench includes an eye-tracking camera device.

Figure 6A:
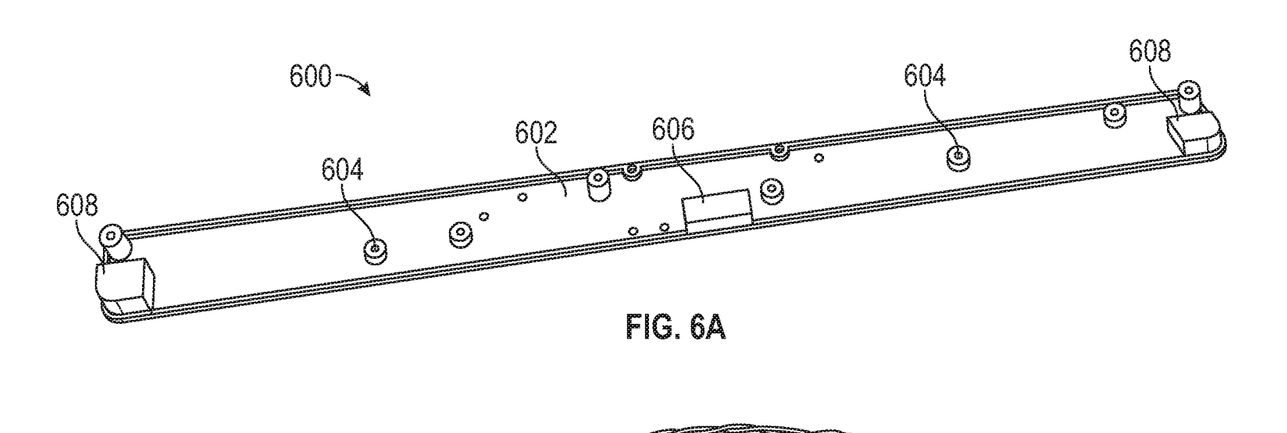
FIG. 6A is a top perspective view of an exemplary optical bench depicting integral mounding features.
Figure 6B:
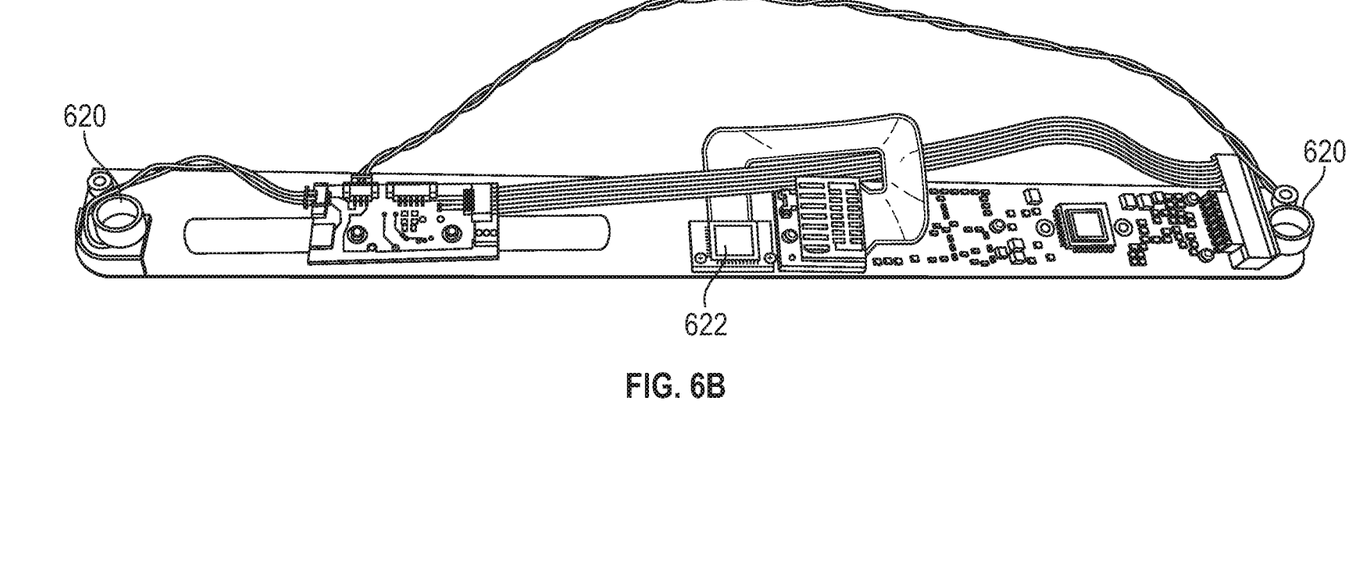
FIG. 6B is a top perspective view of the optical bench of FIG. 6A with circuit board modules, illuminators, and optical components mounted thereto.

Referring now to FIGS. 6A and 6B, an exemplary optical bench 600 comprises an elongated, substantially planar and substantially rectangular platform 602 upon which the illuminators and optical components are mounted. Specifically, the bench includes an inclined lens mount 606 (FIG. 6A) upon which the lens 622 is mounted (FIG. 6B), and inclined illuminator mounts 608 (FIG. 6A) upon which respective illuminators 620 are mounted (FIG. 6B). A plurality of connector tabs 604 support the circuit board modules shown in FIG. 6B which control the operation of the illuminators and image sensing components.

In accordance with various embodiments, the illuminator and/or lens mounts may be integrally formed with the bench, increasing throughput, yield, and reducing overall manufacturing and assembly costs. Alternatively or in addition, the mounts may be subsequently affixed following initial fabrication of the bench, either permanently or adjustably. For example, an adjustable regime may permit the angle(s) of inclination to be increased or decreased to accommodate user preferences or otherwise optimizing performance by using a screw-type adjusting mechanism, or adding or removing "shim" or wedge shaped supports exhibiting predetermined dimensions.

In this regard, the modular nature of the bench facilitates a degree of future proofing; that is, if any of the electronic components (including the control and memory hardware and software), optical components, or the position or orientation (e.g., angle of inclination) of the mounting structures need to be updated or replaced, the optical bench can be removed, adapted, and replaced or simply discarded in favor of a new one. This dynamically configurable "plug-n-play" feature portends reduced cost of ownership while effectively safeguarding various components and their configurations against obsolescence.

Figure 9:
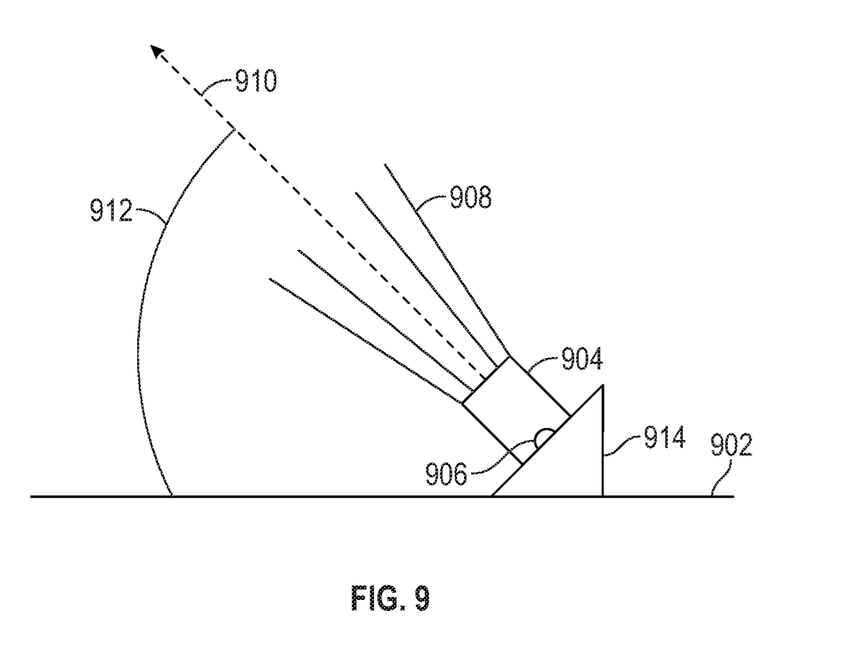
FIG. 9 is a schematic block diagram of a an illuminator mounted to an optical bench at a predetermined angle to direct light towards the user's eye region.

Referring now to FIG. 9, an exemplary illuminator is shown mounted to an optical bench 902. The illuminator comprises a light emitting diode (LED) 906 centered underneath a lens 904. As such, the lens directs the emitted light 908 along a vector 910 substantially orthogonal to the plane of the lens. By mounting the illuminator on an inclined ramp 914, the light may be directed at any desired angle 912 relative to the optical bench. In this way, the light may be directed to the user's eye region.

Figure 10:
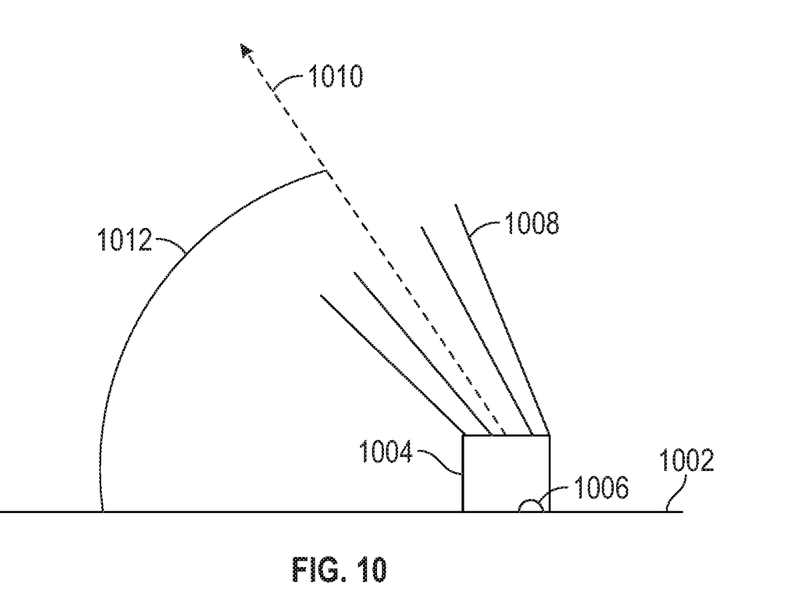
FIG. 10 is a schematic block diagram of an illuminator having its LED shifted relative to its lens to effectively direct light towards the user's eye region without the need for a mounting ramp.

FIG. 10 shows an alternate embodiment of an illuminator, where an LED 1006 is offset relative to the center of the lens 1004. Consequently, the emitted light 1008 is directed along a vector 1010 at a desired angle 1012 relative to the optical bench 1002 as a function of the extent to which the LED is offset from the center of the lens.

Figure 11:
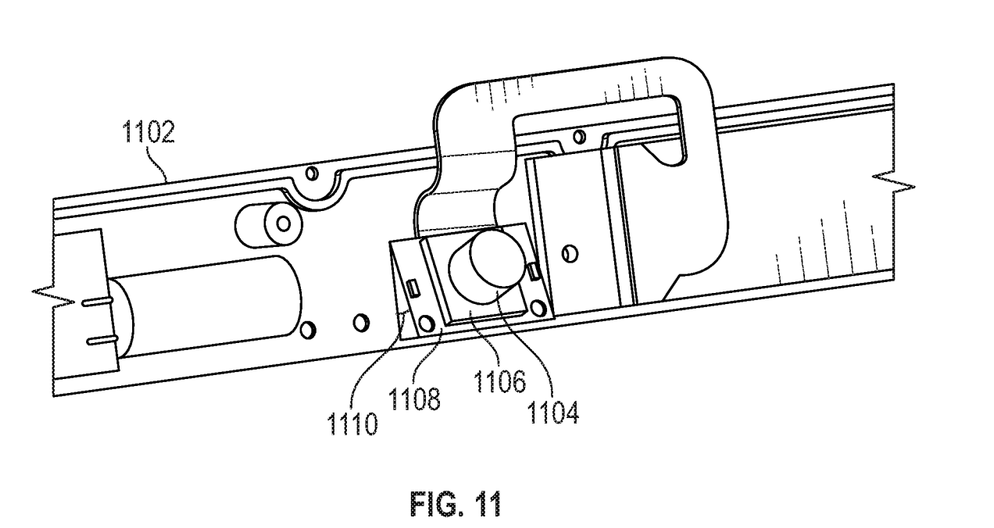
FIG. 11 is a perspective view of a direct lens barrel mounted at an 18 degree angle relative to the optical bench.
Figure 12:
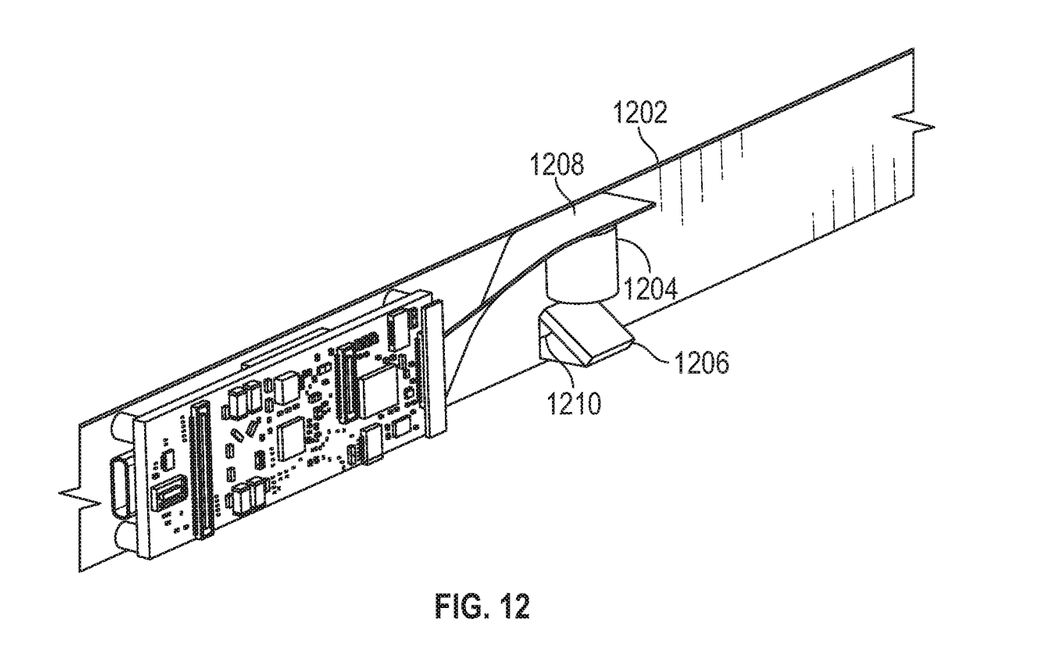
FIG. 12 is a perspective view of a vertical lens barrel mounted to an optical bench alongside a mirror positioned at a nominal angle of 54 degrees relative to the optical bench.
Figure 13:
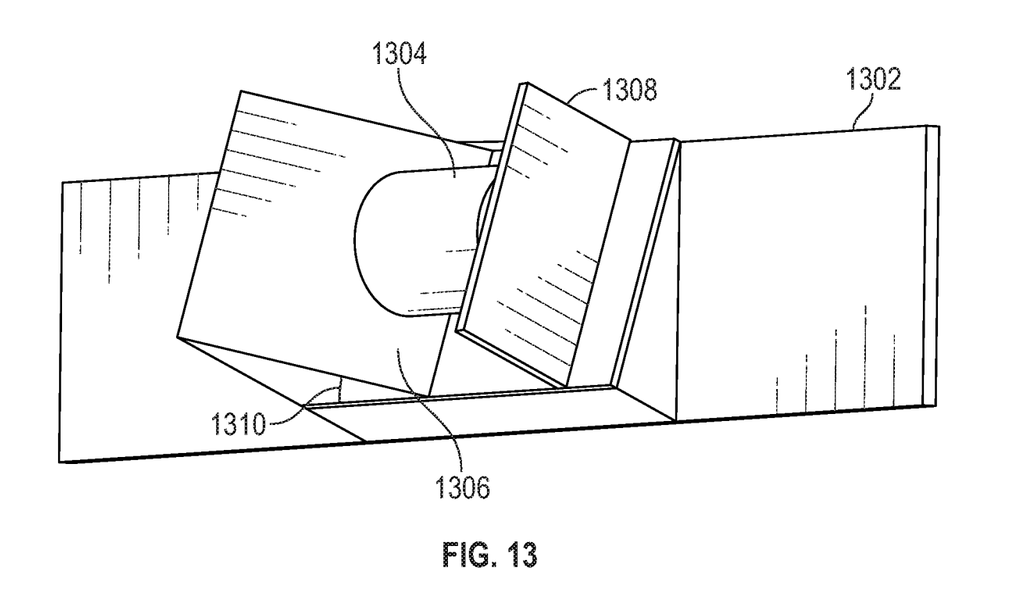
FIG. 13 is a perspective view of a horizontal lens barrel mounted to an optical bench alongside a mirror positioned at a nominal angle of 18 degrees relative to the optical bench.

Referring again to FIG. 4 and also referring to FIGS. 11-13, when the plane in which the lens lies forms a 45° angle with the plane of the display (as shown in FIG. 4), the camera's line-of-sight (which is orthogonal to the lens plane) often "looks" at the user's ribs, rather than at the user's eyes. It is therefore desirable to further incline the camera line-of-sight upwardly to capture the user's eyes. With specific reference to FIG. 11, a lens 1104 and image sensor 1106 may be supported by a lens mount 1106 inclined with respect to the optical bench 1102 (which is coplanar with the motherboard and display screen) at an angle 1110 in the range of 45° to 70°, and preferably about 50° to 60°, and most preferably about 54 to 56°. The illuminators may also be mounted at inclination angles in the same ranges as above; in addition, they may also be inclined inwardly towards the user's face.

FIG. 12 illustrates a vertical lens barrel 1204 mounted to an optical bench 1202 alongside a mirror 1206 positioned at a nominal angle 1210 in the range of 54 to 56 degrees relative to the optical bench.

FIG. 13 illustrates a horizontal lens barrel 1304 and image sensor 1308 mounted to an optical bench 1302 alongside a mirror 1306 positioned at a nominal angle 1310 in the range and image sensor 1208 of 18 degrees relative to the optical bench.

A tablet computer is provided which includes: a substantially rectangular computer display having a forward facing display screen, a rearward facing back side, and a bottom edge, the display having a horizontal dimension H and a vertical dimension V; a substantially rectangular backplane secured against the display back side, the backplane having a horizontal dimension H and a vertical dimension (V+D) such that a first portion of the backplane extends below the bottom edge, where the first portion has a horizontal dimension H and a vertical dimension D; and a transparent cover layer adhered to the display screen, the cover layer having a horizontal dimension H and a vertical dimension (V+D) such that a second portion of the cover layer extends below the bottom edge, where the second portion has a horizontal dimension H and a vertical dimension D. In an embodiment the first and second portions define an accessory region characterized by a horizontal dimension H and a vertical dimension D.

In an embodiment, the tablet computer further includes an electronic accessory at least partially disposed within the accessory region.

In an embodiment, the electronic accessory comprises an eye tracking system.

In an embodiment, the eye tracking system comprises a single support substrate upon which is mounted a lens, an image sensor, and an illuminator.

In an embodiment, the cover layer comprises a substantially opaque border extending along at least one edge of the cover layer.

In an embodiment, at least one edge comprises a bottom edge of the cover layer; the bottom edge of the cover layer comprises a light transmission hole; and the hole is substantially aligned with the lens.

In an embodiment, the tablet computer further includes a substantially planar motherboard interposed between the backplane and the back side of the display.

In an embodiment, the motherboard comprises a first connector designated for a wide area network (WAN) card, a second connector designated for a local area network (LAN) card, and a third connector designated for a hard drive; and a hard drive module is connected to one of the WAN and LAN connectors; and further a universal serial bus module is connected to the hard drive connector.

In an embodiment, the support substrate comprises a substantially flat, elongated strip having a top surface and a lens mount integrally formed with and extending from the top surface.

In an embodiment, the lens mount comprises a substantially flat mounting surface upon which the lens is mounted.

In an embodiment, the mounting surface defines an acute angle relative to the top surface of the support structure of about 56°.

In an embodiment, the support substrate further comprises a second substantially flat mounting surface upon which the illuminator is mounted.

In an embodiment, the lens mount further comprises a reflecting surface inclined at an angle of at least 45°.

In an embodiment, the reflecting surface is configured to direct incumbent light through an optical tube an onto the image sensor.

In an embodiment, the optical tube lies within a tube plane which substantially parallel to the display screen.

A method is also provided for integrating an eye tracking assembly into a computer display. The method includes the steps of: providing a computer display having a bottom edge, a horizontal dimension H and a vertical dimension V; attaching a backplane to the display such that a first portion extends below the display, the first portion having a horizontal dimension H and a vertical dimension D; adhering a transparent layer to the display such that a second layer portion extends below the display, the second portion having a horizontal dimension H and a vertical dimension D; and installing the tracking assembly at least partially inside an accessory region between the first and second portions.

In an embodiment, the step of installing includes mounting a lens, an image sensor, and an illuminator onto a support substrate and installing the support substrate inside the accessory region.

In an embodiment, the method further includes the steps of: applying a substantially opaque border along at least a bottom edge of the transparent layer; forming a light path in the bottom edge of the transparent layer; and aligning the lens with light path.

In an embodiment, the method further includes the steps of: forming a lens mounting pod integrally with the support substrate; and configuring the pod at an angle of about 56° with respect to the support structure surface.

An eye tracking enabled computer includes: a display having a bottom edge, a horizontal dimension of about H, and a vertical dimension V; a backplane secured to the display such that a first segment extends below the display, the first segment having a horizontal dimension of about H and a vertical dimension D1; a transparent layer adhered to the display such that a second segment of the layer extends below the display, the second segment having a horizontal dimension of about H and a vertical dimension D2; a motherboard disposed between the backplane and the display; and an eye tracking assembly located at least partially between the first and second segments.

Various devices, systems and methods comprise a transparent screen assembly that is coupled with a tablet computing device, or other similar end user computing device such as a smartphone, computer display, or television. The transparent screen assembly can include a transparent screen having an at least partially opaque layer that forms a border. The transparent screen can be coupled to a display of the tablet computing device. The transparent screen assembly also embeds an eye-tracking camera device that is obscured in some instances. In some embodiments, the eye tracking camera device is disposed in an optical bench. The transparent screen assembly may include a means for obscuring the eye-tracking camera device to prevent the user from visually detecting the eye-tracking camera device, but which allows the eye-tracking camera device to obtain images of a face of a user. In some embodiments, a portion of the eye tracking camera device could be aligned with an aperture in the transparent screen. The opaque layer could be used to obscure this aperture, which in turn obscures viewing of the eye tracking camera device.

Some embodiments include a unique arrangement of optical elements that allow for increasing a focal length of a camera of the eye-tracking camera device, while remaining in a compact configuration. Some embodiments employ an angled mirror in combination with a laterally disposed lens barrel.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. The computer-executable instructions may be executed locally by the tablet computer itself, or may be executed at least in part by a computing system communicatively coupled to the tablet computer over a network, (e.g., "cloud computing"). In accordance with one embodiment, systems and methods are described herein are implemented in accordance with U.S. patent application Ser. No. 16/434,830, filed Jun. 7, 2019, entitled "Devices and Methods for Reducing Computational and Transmission Latencies in Cloud Based Eye Tracking Systems," the entire contents of which are hereby incorporated by reference. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

We claim:

1. A tablet computer, comprising:
   a substantially rectangular computer display having a forward facing display screen, a rearward facing back side, and a bottom edge;
   a substantially rectangular backplane secured proximate the display back side, the backplane having a first portion extending below the bottom edge;
   a transparent cover layer adhered to the display screen, the cover layer having a second portion extending below the bottom edge, and
   an eye tracking system disposed between the first and second portions and below the bottom edge, the eye tracking system including a lens, and image sensor, and an infrared illuminator;
   wherein:
   the eye tracking system comprises a single support substrate having the lens, image sensor, and illuminator mounted thereon;
   the support substrate comprises a substantially flat, elongated strip having a top surface and a lens mount integrally formed with and extending from the top surface;
   the lens mount comprises a substantially flat mounting surface upon which the lens is mounted; and
   the mounting surface defines an acute angle relative to the top surface of the support structure of about 54° to 56°.

2. A tablet computer comprising:
   a substantially rectangular computer display having a forward facing display screen, a rearward facing back side, and a bottom edge;
   a substantially rectangular backplane secured proximate the display back side, the backplane having a first portion extending below the bottom edge;
   a transparent cover layer adhered to the display screen, the cover layer having a second portion extending below the bottom edge; and
   and eye tracking system disposed between the first and second portions and below the bottom edge, the eye tracking system including a lens, and image sensor, and an infrared illuminator,
   wherein:
   the eye tracking system comprises a single support substrate having the lens, image sensor, and illuminator mounted thereon;
   the support substrate comprises a substantially flat, elongated strip having a top surface and a lens mount integrally formed with and extending from the top surface; and
   the lens mount further comprises a reflecting surface inclined at an angle of at least 45°.

3. The tablet computer of claim 2, wherein the cover layer comprises a substantially opaque border extending along at least one edge of the cover layer.

4. The tablet computer of claim 3, wherein:
   said at least one edge comprises a bottom edge of the cover layer;
   said bottom edge of the cover layer comprises a light transmission hole; and
   said hole is substantially aligned with said lens.

5. The tablet computer of claim 2, further comprising a substantially planar motherboard interposed between the backplane and the back side of the display.

6. The tablet computer of claim 5, wherein:
   the motherboard comprises a first connector designated for a wide area network (WAN) card, a second connector designated for a local area network (LAN) card, and a third connector designated for a hard drive;
   a hard drive module is connected to one of the WAN and LAN connectors; and
   a universal serial bus module is connected to the hard drive connector.

7. The tablet computer of claim 2, wherein:
   the support substrate further comprises a second substantially flat mounting surface upon which the illuminator is mounted.

8. The tablet computer of claim 2, wherein:
   the reflecting surface is configured to direct incumbent light through an optical tube an onto the image sensor.

9. The tablet computer of claim 8, wherein:
   the optical tube lies within a tube plane which substantially parallel to the display screen.

10. A method of integrating an eye tracking assembly of the type including a lens, an image sensor, and an infrared illuminator into a computer display, the method comprising the steps of:
    providing a computer display having a bottom edge,
    attaching a backplane to the computer display such that a first portion of the backplane extends below the bottom edge of the display;
    adhering a transparent layer to the display such that a second portion of the transparent layer extends below the display,
    installing the eye tracking assembly below the bottom edge and at least partially between the first and second portions;
    applying a substantially opaque border along at least a bottom edge of the transparent layer;
    forming a light path in the bottom edge of the transparent layer; and
    aligning the lens with light path;

forming a lens mounting pod integrally with the support substrate; and configuring the pod at an angle in the range of 48 to 56° with respect to the support structure surface.

11. The method of claim 10, wherein the step of installing includes mounting a lens, an image sensor, and an illuminator onto a support substrate and installing the support substrate inside the accessory region.

\* \* \* \* \*